United States Patent
Belkowitz et al.

(10) Patent No.: US 11,542,168 B2
(45) Date of Patent: *Jan. 3, 2023

(54) ALUMINA-MODIFIED COLLOIDAL SILICA PARTICLES, CEMENTITIOUS PRODUCTS CONTAINING SAME, AND METHODS OF USE THEREOF

(71) Applicant: Intelligent Concrete, LLC, Elbert, CO (US)

(72) Inventors: Jonathan S. Belkowitz, Elbert, CO (US); WhitneyLe B. Belkowitz, Elbert, CO (US)

(73) Assignee: Intelligent Concrete, LLC, Elbert, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,887

(22) Filed: Jun. 7, 2021

(65) Prior Publication Data

US 2021/0292175 A1 Sep. 23, 2021

Related U.S. Application Data

(63) Continuation of application No. 16/426,484, filed on May 30, 2019, now Pat. No. 11,027,980.

(51) Int. Cl.
*C01B 33/146* (2006.01)
*C04B 14/04* (2006.01)
*C04B 7/02* (2006.01)
*C04B 14/30* (2006.01)
*C04B 14/06* (2006.01)

(52) U.S. Cl.
CPC .............. *C01B 33/146* (2013.01); *C04B 7/02* (2013.01); *C04B 14/041* (2013.01); *C04B 14/062* (2013.01); *C04B 14/303* (2013.01)

(58) Field of Classification Search
CPC ........ C04B 7/02; C04B 14/041; C04B 14/062; C04B 14/1303; C04B 18/08; C04B 20/008; C04B 20/1066; C04B 28/04; C04B 2111/00112; C04B 2111/2023; C04B 2201/52; C01B 33/146; Y02W 30/91

See application file for complete search history.

(56) References Cited

U.S. PATENT DOCUMENTS

| | | | | |
|---|---|---|---|---|
| 3,252,917 A | ‡ | 5/1966 | Mindick | .............. C01B 33/149 516/80 |
| 6,800,130 B2 | ‡ | 10/2004 | Greenwood | ........ C04B 40/0039 106/737 |
| 11,027,980 B2 | * | 6/2021 | Belkowitz | ................ C04B 7/02 |
| 2020/0062659 A1 | ‡ | 2/2020 | Hartman | ................ C04B 7/361 |

OTHER PUBLICATIONS

Derwent-Acc-No. 2009-F27795, abstract of Brazilian Patent Specification No. BR 200802121 A2. (Year: 2008).‡
Pauly et al, "Surface Modification of alumina-coated silica nanoparticles in aqueous sols with phosphonic acids and impact on nanoparticle interactions", Phys. Chem. Chem Phys., 19173-19182. (Year: 2015).‡
Hendrix et al, "Behavior of Colloidal Nanosilica in an Ultrahigh Performance Concrete Environment Using Dynamic Light Scattering", Materials. 12, 1976, 1-14. (Year: 2019).‡

\* cited by examiner
‡ imported from a related application

*Primary Examiner* — Anthony J Green
(74) *Attorney, Agent, or Firm* — Foley & Lardner LLP

(57) ABSTRACT

Alumina-modified colloidal silica nanoparticles mitigate Alkali Silica Reaction (ASR) in cementitious compositions. Additives containing the nanoparticles are used in methods of reducing ASR in concrete and to form cementitious compositions. Cementitious products, such as concrete, made by these methods are described herein.

17 Claims, 4 Drawing Sheets

| Materials/ Mix ID | F Ash | 3 – 5 nm | 10 – 12 nm | 45 – 47 nm |
|---|---|---|---|---|
| | | (CB fluid ounces per cementitious hundred weight) | | |
| Type I/II Portland Cement | 0.0% | - | - | - |
| F Ash | 30.0% | - | - | - |
| F Ash | 18.0% | - | - | - |
| F Ash + CB DOS 1 | - | 29.97% + 0.03% (2.60) | 29.95% + 0.05% (2.13) | 29.85% + 0.15% (4.11) |
| F Ash + CB DOS 2 | - | 29.70% + 0.30% (26.03) | 29.50% + 0.50% (21.30) | 28.50% + 1.50% (41.09) |
| F Ash + CB DOS 3 | - | 29.40% + 0.60% (52.06) | 29.00% + 1.00% (42.60) | 27.00% + 3.00% (82.18) |
| F Ash + CB DOS 4 | - | 28.80% + 1.20% (104.13) | 28.00% + 2.00% (85.22) | 24.00% + 6.00% (164.36) |
| F Ash + CB DOS 5 | - | 27.60% + 2.40% (208.25) | 26.00% + 4.00% (170.44) | 18.00% + 12.0% (328.71) |

FIG. 1

| Materials/ Mix ID | F Ash | 3-100 nm / 10 – 12 nm | 3 - 100 nm | 45 - 47 nm / 10 – 12 nm |
|---|---|---|---|---|
| | | (CB fluid ounces per cementitious hundred weight) | | |
| F Ash + CB DOS 6 | - | 26.00% + 4.00%<br>3-100, 3.5% (95.87)<br>10-12, 0.5%<br>(21.31) | 26.00% + 4.00%<br>(87.66) | 26.00% + 4.00%<br>45-47, 3.5% (95.87)<br>10-12, 0.5%<br>(21.31) |
| F Ash + CB DOS 7 | - | 28.00% + 2.00%<br>3-100, 1.75% (47.94)<br>10-12, 0.25%<br>(10.66) | 28.00% + 2.00%<br>(43.83) | 28.00% + 2.00%<br>45-47, 1.75%<br>(47.94)<br>10-12, 0.25%<br>(10.66) |

FIG. 2

ALUMINA-MODIFIED COLLOIDAL SILICA PARTICLES, CEMENTITIOUS PRODUCTS CONTAINING SAME, AND METHODS OF USE THEREOF

CROSS-REFERENCE TO RELATED APPLICATIONS

This application is a continuation of U.S. application Ser. No. 16/426,484, filed May 30, 2019, now U.S. Pat. No. 11,027,980, the contents of which are incorporated herein by reference in its entirety.

FIELD OF THE INVENTION

The invention relates generally to alumina-modified colloidal silica nanoparticles that mitigate Alkali Silica Reaction in cementitious compositions, and methods of using the nanoparticles to produce improved cementitious compositions.

BACKGROUND

Chemical degradation of concrete structures nationally account for a substantial amount of taxpayer dollars. Alkali Silica Reaction (ASR) gel is one of the chemical degradation mechanisms that contributes to the reduction of the structural integrity of concrete civil structures, which must then be repaired or replaced. Current ASR mitigation materials and the associated concrete mixtures are falling short of generating durable concrete infrastructure. Excessive ASR gel damage in concrete is characterized by excessive map cracking that compromises the structural integrity of the concrete. Concrete that is exposed to the environment, particularly exposed concrete with a wetted surface, is susceptible to excessive ASR gel expansion, which causes map-cracking, leading to degradation of the concrete composite, and ultimately, failure of the concrete structure. Supplementary additives in the form of secondary cementitious and pozzolanic materials are used to fortify concrete against this ASR gel expansion but often fail.

ASR gel is defined as an expansive gel that is created by the combination of reactive silica, soluble alkalis, and hydroxides in the cementitious solution (Belkowitz, J. S., An Analysis of the Use of Nano Silica To Alkali-Silica Reaction in Concrete, Stevens Institute of Technology, 2015, 274). Stresses develop as ASR gel expands in the confined space of the hydrating cementitious matrix of the concrete structure (Belkowitz, J. S., An Analysis of the Use of Nano Silica To Alkali-Silica Reaction in Concrete, Stevens Institute of Technology, 2015, 274). Under normal conditions, this process takes several months, or even years, to evolve, but can be accelerated by harsh environments, availability of soluble alkalis, and availability of absorbed $H_2O$ from the environment. Also, diffusion of $H_2O$ into concrete can be accelerated by cracking in the hydrated cementitious matrix of concrete. Due to the porous structural network and brittle nature of the HCM, cracks gradually form throughout the concrete. Failure will ensue, as soluble alkalis in the cement paste combine with reactive silica in the aggregate to form an expansive gel at the interfacial zone. The expansive forces cause micro-stresses that compromise the concrete structure. These micro-stresses eventually lead to cracks, increasing the permeability of the concrete and exacerbating ASR gel expansion. Eventually, the composite structure of the concrete is compromised by the expansion, and the concrete structure becomes unserviceable.

What is needed in the art is an additive that can be directly added to a cementitious mixture to reduce ASR in any cementitious composite, and to increase the compressive and flexural strength of a formed cementitious article (e.g., concrete).

SUMMARY

Described herein are novel alumina-modified colloidal silica nanoparticles that mitigate ASR in cementitious compositions, additives containing the nanoparticles, methods of using the nanoparticles and additives to reduce ASR in concrete and to form cementitious compositions, and cementitious products made by these methods. The nanoparticles and additives described herein address the problem of ASR and other forms of chemical and physical attack in cementitious products such as concrete.

Accordingly, described herein is a method of forming a cementitious composition (e.g., concrete). The method includes mixing water, cement and an additive including colloidal silica nanoparticles that are at least partially coated in alumina in an aqueous solution (e.g., water). In the method, the colloidal silica nanoparticles have diameters of about 3 nm to about 100 nm, e.g, about 3 nm to about 5 nm, about 9 nm to about 12 nm, about 15 nm to about 17 nm, about 45 nm to about 47 nm, etc. In the method, the colloidal silica nanoparticles are present from about 2.5% to about 55% based on the total weight of the additive. The colloidal silica nanoparticles can include about 0.03% to about 12% of a weight of the cementitious composition. In the method, the concentration of colloidal silica nanoparticles is proportional to the diameters of the colloidal silica nanoparticles. The additive pH is typically between about 5.0 and about 11.5. In a typical embodiment, the concrete is Standard, High Performance, Ultra High Performance, Recycled Concrete Aggregate, Roller Compacted Concrete, Self-Consolidating Concrete, Light Weight Concrete, Shotcrete, Gunnite, Grout, or Mortar. In a typical embodiment, the cement is ASTM C 150 Type I, I/II, II, III, IV, or V; ASTM C 1157; ASTM C approved SCMs; or ASCMs. In some embodiments, the additive further includes at least one dispersion agent. In the method, the colloidal silica nanoparticles are present from about 2.5% to about 55% based on the total weight of the additive.

Also described herein is a cementitious product made by a method of forming a cementitious composition including mixing water, cement and an additive including colloidal silica nanoparticles that are at least partially coated in alumina in an aqueous solution. The cementitious product is susceptible to reduced ASR relative to a reference mixture including the colloidal silica nanoparticles that are at least partially coated in alumina. In some embodiments, the cementitious product has a compressive strength in the range of about 2000 to about 30000 psi at about 20 days to about 60 days (e.g., at about 28 days to about 56 days, at about 28 days, at about 30 days, at about 35 days, at about 45 days, at about 50 days, at about 56 days) subsequent to mixing. For concrete mixes the strengths are typically measured at 28-day. However, there are some mixes, especially concrete mixes containing Class F Fly Ash, where the strength tests are carried out to 56-days. In some embodiments, the cementitious product has a compressive strength in the range of about 5000 to 7500 psi at about 20 days to about 60 days (e.g., at about 28 days to about 56 days, at about 28 days, at about 30 days, at about 35 days, at about 45 days, at about 50 days, at about 56 days) subsequent to mixing. In one embodiment, the cementitious product is concrete and has reduced permeability over time, increased compressive and flexural strength over time, and increased resistance to chemical attack from acidic solutions, deicing brines and ASR over time, relative to a reference mixture including the colloidal silica nanoparticles that are at least partially coated in alumina.

Further described herein is a method of reducing ASR in concrete. The method includes mixing into the concrete an additive including colloidal silica nanoparticles that are at least partially coated in alumina in an aqueous solution. In the method, the colloidal silica nanoparticles have diameters of about 3 nm to about 100 nm, e.g., of about 3 nm to about 5 nm, of about 9 nm to about 12 nm, of about 15 nm to about 17 nm, of about 45 nm to about 47 nm, etc. In the method, the concentration of the colloidal silica nanoparticles is proportional to the diameters of the colloidal silica nanoparticles. In the method, the additive pH is between about 5.0 and about 11.5.

Also described herein is a composition including colloidal silica nanoparticles that are at least partially coated in alumina in an aqueous solution.

Still further described herein is an additive for cementitious compositions including colloidal silica nanoparticles at least partially coated in alumina and a dispersion agent in an aqueous solution.

By the term "alumina-modified colloidal silica nanoparticle" is a dispersion of silica nanoscopic particles or colloidal silica whose surface is at least partially coated with alumina (aluminum oxide), and that is measured on the nanoscale, usually one that measures approximately one to 100 nanometers. Throughout the application, the terms "nanoparticles" and "nano silica particles" are used interchangeably with "alumina-modified colloidal silica nanoparticles".

As used herein, the term "additive" means a substance added to another in relatively small amounts to impart or improve desirable properties or suppress undesirable properties.

Although nanoparticles, compositions, additives, and methods similar or equivalent to those described herein can be used in the practice or testing of the present invention, suitable nanoparticles, compositions, additives, and methods are described below. All publications, patent applications, and patents mentioned herein are incorporated by reference in their entirety. In the case of conflict, the present specification, including definitions, will control. The particular embodiments discussed below are illustrative only and not intended to be limiting.

BRIEF DESCRIPTION OF THE DRAWINGS

FIG. 1 is a table showing changes that are made to the basic mixture outline in Table 2 below. These changes are made to illustrate the impact of the nano distribution of particle size and surface area on ASR over time.

FIG. 2 is a table showing changes to the basic mixture and to the nano particle distributions to maximize the reduction in ASR potential.

DETAILED DESCRIPTION

Figure 3:
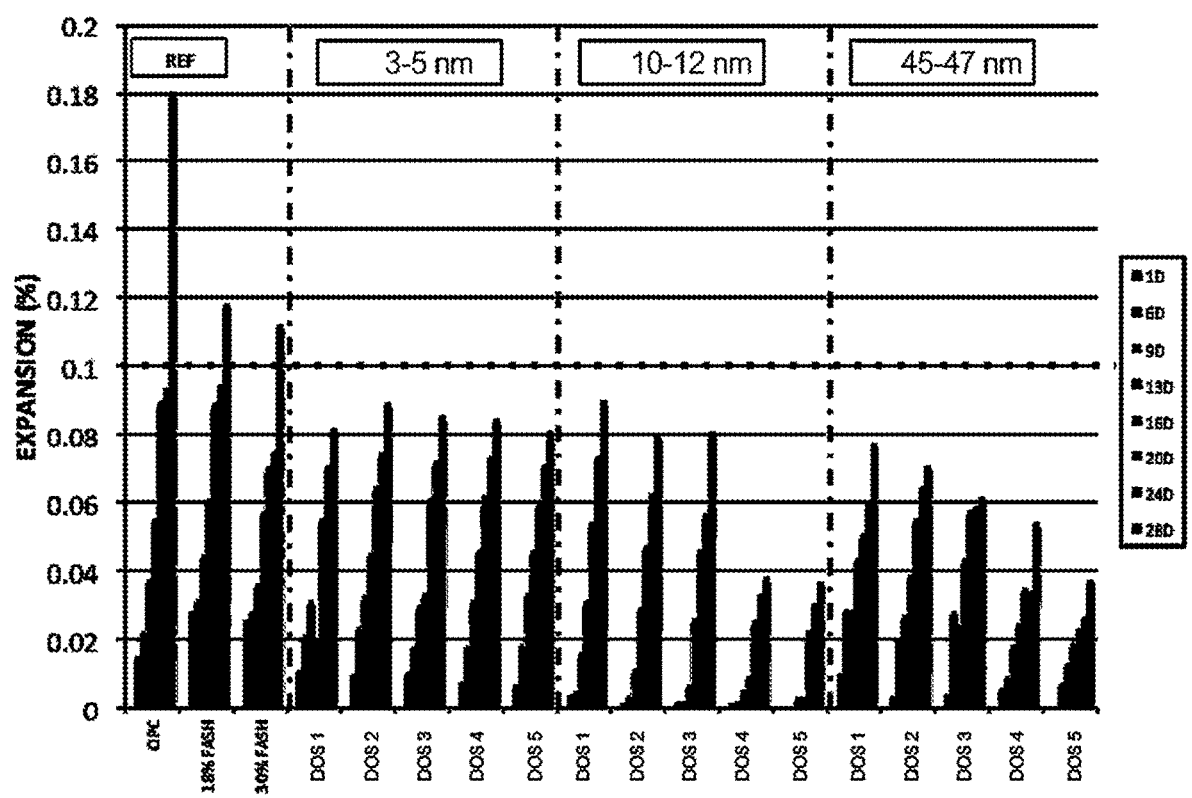
FIG. 3 is a graph of ASR results from the mixture listed in FIG. 1.

Described herein are novel colloidal silica nanoparticles that are at least partially coated in alumina and are typically present in an aqueous solution. Such nanoparticles can form an additive (sometimes referred to as "a silica nanoparticle distribution"). In one embodiment, an additive or composition containing the nanoparticles is a universal dispersion of alumina-treated silica nanoparticles in water. The pH of the dispersion can very between 5.0 and 11.5. The alumina treatment can be over the entire nanoparticle or it can partially coat the nanoparticle (e.g., a partial coating of alumina). In embodiments in which the nanoparticles are only partially coated with alumina, the colloidal silica surface area will induce a pozzolanic reaction in addition to the alumina treatment.

The colloidal silica nanoparticles can be produced by any suitable method. When nano silica particles are produced, the process normally begins with the tearing down of a potassium or sodium silicate. The free silicas starts building onto each other to form agglomerates. The shape, size and distribution of sizes is then controlled by the addition of a stabilizing agent(s). For most bare nano silica particles, sodium oxide is used to slow down nano silica particle growth and stabilize the nano silica particles to complete the universal dispersion or colloidal silica. Alumina is another stabilizing agent that is added during the growth process. With the addition of alumina, the nano silica particle in the colloidal suspension will have part of its surface covered with alumina. The silica that would normally be on the surface that would chemically react with calcium hydroxide is not covered and reacts over longer periods of time.

In a typical embodiment, a method of forming a cementitious composition (e.g., concrete) includes mixing water, cement, aggregate and an additive including colloidal silica nanoparticles that are at least partially coated in alumina in an aqueous solution (e.g., water). In some embodiments, the additive further includes at least one dispersion agent. The diameter and particle size distribution of the colloidal silica nanoparticles will depend upon aggressiveness of the ASR and terms when the mechanisms of ASR deteriorate the concrete and can be determined using the methods below in Embodiments 1, 2, 3, and 4. In a typical embodiment, the concentration of colloidal silica nanoparticles is proportional to the diameters of the colloidal silica nanoparticles. In the method, the colloidal silica nanoparticles are typically present from about 2.5% to about 55% based on the total weight of the additive, and typically comprise about 0.03% to about 12% of a weight of the cementitious composition.

The concentration range of the nanoparticles within an additive and within the concrete mixture can vary based on particle size, distribution, and surface reactivity. The smaller particle sizes and size distribution will have a higher surface of both the silica and alumina that is available for reaction. For that reason, a colloidal silica with a smaller particle size and size distribution with a lower alumina content will require a lower dosage than a colloidal silica with a larger size distribution and higher amount of alumina treated surface.

An optimal concentration range for three different colloidal silica with different size distribution based on keeping the surface area constant between each dispersion is presented below as Embodiments 1, 2, 3, and 4. A higher dosage will be needed as the particle size increases to keep surface area constant.

Embodiment 1: averaged 4 nm diameter narrow distribution of an 35% surface treated nano silica particle in a water suspension with a solids content of 15% is mixed into a concrete for ASR mitigation. The percent replacement of cementitious is 0.05% of solids which comes to 4.65 fl oz per cementitious hundred weight. This smaller and narrow type of colloidal silica would be used for a concrete that had ASR potential and the mechanisms of failure manifest over short periods of time.

Embodiment 2: averaged 11 nm narrow distribution of an 35% surface treated nano silica particle in a water suspension with a solids content of 30% is mixed into a concrete for ASR mitigation. The percent replacement of cementitious is 0.09% of solids which comes to 3.83 fl oz per cementitious hundred weight. This intermediate and narrow type of colloidal silica would be used for a concrete that had ASR potential and the mechanisms of failure manifest over short to long periods of time.

Embodiment 3: averaged 45 nm narrow distribution of an 35% surface treated nano silica particle in a water suspension with a solids content of 40% is mixed into a concrete for ASR mitigation. The percent replacement of cementitious is 0.28% of solids which comes to 7.52 fl oz per cementitious hundred weight. This larger and narrow type of colloidal silica would be used for a concrete that had ASR potential and the mechanisms of failure manifest over long periods of time.

Embodiment 4: 3 to 100 nm wide distribution of an 35% surface treated nano silica particle in a water suspension with a solids content of 40% is mixed into a concrete for ASR mitigation. The percent replacement of cementitious is 4.00% of solids which comes to 87.66 fl oz per cementitious hundred weight. This wider particle size distribution of colloidal silica would be used for a concrete that had ASR potential and the mechanisms of failure manifest over both short and long periods of time.

The colloidal silica concrete additives described herein can be a mixture of alumina-treated nano silica particles and one or more dispersion agents to increase the stability of the colloidal silica portion of the additive and its ability to disperse when added to the concrete. Examples of dispersion agents include poly-carboxylate comb polymers (PCP) additives, and PCP-style high range water reducer packages.

A cementitious composition as described herein can also contain any other known additive for cement that does not adversely affect the desired properties of the present invention. Types of additives include, but are not limited to, set accelerators, set retarders, air entraining agents, air detraining agents, foaming agents, defoaming agents, corrosion inhibitors, shrinkage reducing agents, pozzolans, dispersing agents, pigments, coarse aggregate, and fine aggregate. Other additives that can be used in cementitious compositions can be found in U.S. Pat. No. 5,728,209 which is incorporated herein by reference. An example of a fine aggregate is silica sand. Examples of coarse aggregates include silica, quartz, crushed round marble, glass spheres, granite, limestone, calcite, feldspar, alluvial sands, and any other durable aggregate, and mixtures thereof.

The cementitious products described herein demonstrate improved properties relative to a reference mixture. By "a reference mixture" is meant a concrete that conforms to the concrete stipulated in ASTM C494/C494M-17. See Concrete and Aggregates (Annual Book of ASTM Standards, Section 4: Construction, Volume 04.02-2008, 2008, ASTM International, West Conshochocken, Pa.) The compressive and flexural strength of the concrete produced using the nanoparticles and additives described herein are improved to a reference mixture, and can vary. An example range of compressive strength of a concrete product produced using the nanoparticles described herein is, but not limited to, 2000 to 30000 psi (13.8 to 207 MPa) at 28-days from mixing. The concrete mix in Embodiments 1-4 above would be for a concrete mix that would have a 28-day compressive strength between 5000 to 7500 psi (34.5 to 51.7 MPa) at 28-days from mixing. As long as the granular skeleton has a tendency to react with alkalis and form the ASR gel and would eventually cause a reduction in service life, there is a need for the alumina-treated silica nanoparticles described herein.

Additional improvements and enhanced properties of concrete produced by the colloidal silica concrete additives described herein include reduced permeability over the long-term, increased long-term strengths over un-treated colloidal silica, increased resistance to chemical attack from acidic solutions, deicing brines, and ASR, and reduced sensitivity of the agglomeration of the colloidal silica dispersion due from low cement alkalinity and or the use of electrolyte-based water reducers (normal or mid-range water reducers).

Improvements and enhanced properties of the hydrated matrix of the cementitious composite that makes up concrete produced by the colloidal silica concrete additives described herein include accelerated Cement Dissolution; Instantaneous Calcium-Silicate-Hydrate (C-S-H) Polymerization, Pozzolanic Reaction and C-S-H Seeds; Pore Water Reduction; Free Alkali Content Reduction; Reduction in Permeability; Reduction in Cementitious matrix corrosion from Alkali-Silica Reactivity and gel formation; Chemical binding of alkalis into hydrated cement matrix; and Coating/Protecting the reactive aggregate from dissolution.

EXAMPLES

The present invention is further illustrated by the following specific examples. The examples are provided for illustration only and should not be construed as limiting the scope of the invention in any way.

Example 1—Alumina Modified Colloidal Silica Particles to Mitigate ASR in Concrete While failure due to ASR in concrete was historically not normally recognized as one of the leading causes of reduced durability in concrete structures, it has become more common within recent years. Common ASR mitigators, such as Class F fly ash (a refined coal combustion residue), have been shown to be less effective in reducing expansion due to ASR. The research described herein characterizes the scientific mechanisms of introducing alumina modified colloidal silica particles into concrete mixtures as a co-mitigator (with Class F fly ash) of ASR.

The mortar bar expansion test performed over 28-days was employed as specified in ASTM C 1260 and 1567. The nano silica was dosed as a dry replacement of the CLASS F FLY ASH (F ASH) but added as a liquid to the mortar mixtures. The batch water for the mortar was adjusted to keep the design water constant and took into account the water brought by the colloidal silica dispersion that contained the nano silica particles. This process takes into account the water brought by the colloidal silica dispersion to the mix in order to keep the water/cementitious ratio constant.

In some embodiments per ASTM C 1260 and ASTM C 1567, the colloidal silica dispersion is mixed into the fluid mortar mixture. The mortar is mixed and placed into three steel molds and cured for 24-hrs. The beams lengths are measured at 24-hrs from cast. The mortar beams are placed in a water-bath and cured at 175 F for 24-hrs. The beams are measured after the second 24-hrs cure. The beams are then placed in a NaOH solution and cured for 28-days. The lengths of the beams are measured intermittently and compared back to the second 24-hr cure. As to what happens to the beams during the remaining test period, the ASR will cause the development of an expansive gel around the aggregate within the mortar beams. This expansion will cause the mortar beams to grow and crack. The cracking will cause the beams to absorb more water and the gel to expand more. The growth of this beam will be measured over time based on a change in length. A beam that expands faster and to a greater percentage over the 28-days is considered to have a higher and unpredictable ASR-potential.

The ASTMs in Table 1 below, and the base-line mixture in Table 2 below, represent experimental regimes and mixtures to be performed to identify a means to understand and employ the impact size, surface area, and content of alumina-modified colloidal silica on the expansions of cementitious mortar bars due to ASR.

TABLE 1

Test Matrix for both Laboratory and Field Experiments

ASTM 1260 - Potential Alkali Reactivity of
Aggregates (14 and 28 Day results)
ASTM 1567 - Determining Potential Alkali-
Silica Reactivity of Combinations of
Cementitious Materials and Aggregates (14
and 28 Day results)

TABLE 2

References for Mortar Mixture

| Materials/Mix ID | Grams |
| --- | --- |
| Cementitious | 440 |
| ASTM C 33, Concrete Sand | 990 |
| water/cementitious | 0.47 |

The tables in FIGS. 1 and 2 list the constituents for the reference mixtures. For a basis of comparison, control mixtures were analyzed before the experiments are carried out using the additives; these mixtures were called TYPE I/II Portland Cement, 18% F ASH, and 30% F ASH. The alumina-modified colloidal silica were added to the mortar mixes based on the mixes listed in FIGS. 1 and 2. The mixtures are proportioned to adhere to the standard mix listed in Table 2.

The specific dosages of nano silica were chosen in order to capture both the benefits and limitations of the nano silica in the mixtures. The initial dosages were designed to equal the amount of silica surface area supplied by a 30% replacement of OPC by Class F fly ash for the different particle size distributions employed. The total free silica surface area brought to the concrete composite by the F ASH was calculated. Nano silica replacement dosages were adjusted for each nano silica size distribution to keep the amount of free silica surface area constant between sample sets. Each successive dosage represented an increase in the amount of colloidal silica which meant an increase in the amount silica surface area.

The data illustrated in FIG. 3 elucidates the impact of adding narrow distribution of nano silica. At the smallest sized distribution of nano silica particles, a diminished return was recognized which is believed to be a result of poor dispersion, agglomeration, and a reduction in efficiency of the smallest distribution of nano silica particles. This phenomenon can be a direct effect of the smaller particles' smaller electrical double layer (surface potential) which is the mechanism for reducing manifestation of the attractive forces created from Brownian Motion and the collision of adjacent nano silica particles. This is not the case for the increasing dosage of larger nano silica particles. These larger sized dispersions required higher dosages to maintain the same surface area as the smallest distribution. Because of the larger particle size there is a larger electrical double layer that creates an environment for the particles to be more resilient to agglomerations and more efficient for ASR mitigation over time.

Figure 4:
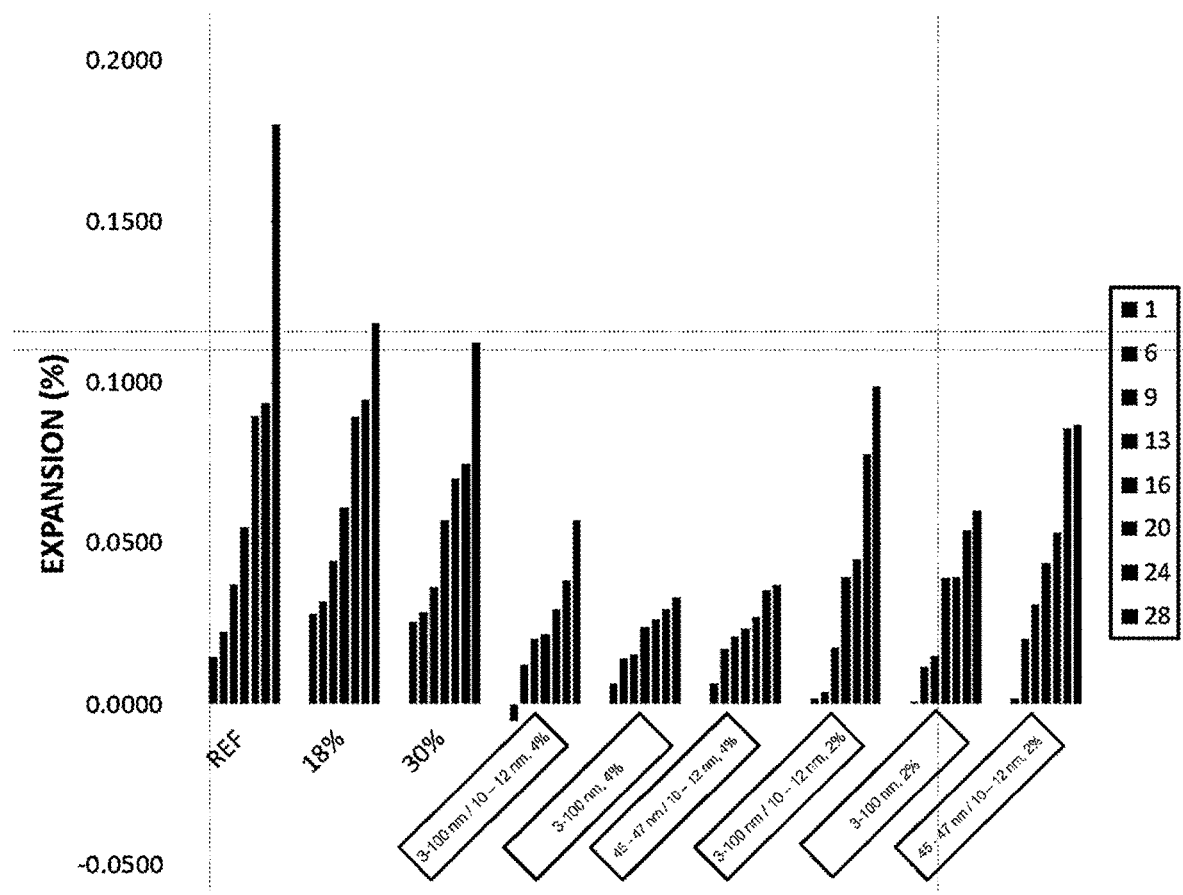
FIG. 4 is a graph of ASR results from the mixture listed in FIG. 2.

The data illustrated in FIG. 4 exemplifies the impact of creating a nano-gradation envelope for the narrow distributions of alumina-modified nano silica particles. Ultimately, it was found that a wide distribution, three to 100 nm, of alumina-modified nano silica particles created the best environment for reducing the impact of ASR on the mortar beam. One of the key factors found from the combination of sizes and the development of these new distributions is the positive ASR impact without the tendency for agglomeration at higher dosages.

Other Embodiments

Any improvement may be made in part or all of the nanoparticles, compositions, additives and method steps. All references, including publications, patent applications, and patents, cited herein are hereby incorporated by reference. The use of any and all examples, or exemplary language (e.g., "such as") provided herein, is intended to illuminate the invention and does not pose a limitation on the scope of the invention unless otherwise claimed. Any statement herein as to the nature or benefits of the invention or of the preferred embodiments is not intended to be limiting, and the appended claims should not be deemed to be limited by such statements. More generally, no language in the specification should be construed as indicating any non-claimed element as being essential to the practice of the invention. This invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contraindicated by context.

What is claimed is:

1. A composition comprising water, cement, and an additive comprising colloidal silica nanoparticles that are at least partially coated in alumina.

2. The composition of claim 1, wherein the colloidal silica nanoparticles have an average diameter of about 3 nm to about 100 nm.

3. The composition of claim 2, wherein the colloidal silica nanoparticles have an average diameter of about 3 nm to about 5 nm.

4. The composition of claim 2, wherein the colloidal silica nanoparticles have an average diameter of about 9 nm to about 12 nm.

5. The composition of claim 2, wherein the colloidal silica nanoparticles have an average diameter of about 15 nm to about 17 nm.

6. The composition of claim 2, wherein the colloidal silica nanoparticles have an average diameter of about 45 nm to about 47 nm.

7. The composition of claim 1, wherein the colloidal silica nanoparticles are present from about 2.5% to about 55% based on the total weight of the additive.

8. The composition of claim 1, wherein the colloidal silica nanoparticles comprise about 0.03% to about 12% of a weight of the composition.

9. The composition of claim 2, wherein a concentration of colloidal silica nanoparticles is proportional to the diameters of the colloidal silica nanoparticles.

10. The composition of claim 1, wherein the additive pH is between about 5.0 and about 11.5.

11. The composition of claim 1, wherein the cement is selected from the group consisting of: ASTM C 150 Type I, I/II, II, III, IV, or V; ASTM C 1157; ASTM C approved SCMs; and ASCMs.

12. The composition of claim 1, wherein the additive further comprises at least one dispersion agent.

13. The composition of claim 1, wherein the colloidal silica nanoparticles are present from about 2.5% to about 55% based on the total weight of the additive.

14. A cured cementitious material prepared from a composition comprising water, cement, and an additive comprising colloidal silica nanoparticles that are at least partially coated in alumina.

15. The cured cementitious material of claim 14 that is susceptible to reduced Alkali Silica Reaction (ASR) relative to a reference mixture comprising the colloidal silica nanoparticles that are at least partially coated in alumina.

16. The cured cementitious material of claim 15, wherein the material has a compressive strength in the range of about 2000 to 30000 psi at about 20 days to about 60 days subsequent to mixing.

17. The cured cementitious material of claim 14, wherein the material is concrete and has reduced permeability over time, increased compressive and flexural strength over time, and increased resistance to chemical attack from acidic solutions, deicing brines and ASR over time, relative to a reference mixture comprising the colloidal silica nanoparticles that are at least partially coated in alumina.

\* \* \* \* \*